(12) United States Patent
Chen et al.

(10) Patent No.: US 11,363,187 B2
(45) Date of Patent: Jun. 14, 2022

(54) FOCUSING METHOD AND APPARATUS APPLIED TO TERMINAL DEVICE, AND TERMINAL DEVICE

(71) Applicant: HUAWEI TECHNOLOGIES CO., LTD., Guangdong (CN)

(72) Inventors: Cong Chen, Shenzhen (CN); Chengtao Zhou, Hangzhou (CN); Yongyi Wang, Hangzhou (CN); Kenji Ishibashi, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/227,007

(22) Filed: Apr. 9, 2021

(65) Prior Publication Data

US 2021/0227147 A1    Jul. 22, 2021

Related U.S. Application Data

(63) Continuation of application No. PCT/CN2019/088971, filed on May 29, 2019.

(30) Foreign Application Priority Data

Oct. 12, 2018 (CN) .......................... 201811192309.X

(51) Int. Cl.
*H04N 5/232* (2006.01)
*G02B 7/38* (2021.01)

(52) U.S. Cl.
CPC ......... *H04N 5/232122* (2018.08); *G02B 7/38* (2013.01); *H04N 5/23287* (2013.01); *H04N 5/23293* (2013.01)

(58) Field of Classification Search
CPC ......... H04N 5/232122; H04N 5/23287; H04N 5/23293; H04N 5/232123;
(Continued)

(56) References Cited

U.S. PATENT DOCUMENTS 9,077,890 B2 *   7/2015  Sweet, III ........ H04N 5/232127
10,044,926 B2    8/2018  Galor Gluskin et al.
(Continued)

FOREIGN PATENT DOCUMENTS

CN    101351724 A    1/2009
CN    103380392 A   10/2013
(Continued)

OTHER PUBLICATIONS

Office Action issued in Chinese Application No. 201811192309.X dated Jun. 17, 2021, 6 pages (with English translation).
(Continued)

*Primary Examiner* — Yogesh K Aggarwal
(74) *Attorney, Agent, or Firm* — Fish & Richardson P.C.

(57) ABSTRACT

Examples in this application disclose a focusing method and apparatus applied to a terminal device, and the terminal device. One example method includes detecting whether a current frame includes a target object, where the target object is one of preset objects on which focusing needs to be performed. When the current frame includes the target object, a determination is made as to whether the target object is in a motion state. When the target object is in the motion state, tracking focusing is performed by using phase detection PD information with a variable filtering length. When the target object is in a static state, stable focusing is performed by using PD information obtained in an adaptive fixed PD configuration mode.

20 Claims, 8 Drawing Sheets

(58) Field of Classification Search
CPC ......... H04N 5/232127; H04N 5/23219; H04N 5/23245; H04N 5/23212; G02B 7/38; G03B 3/10; G03B 13/34; G03B 30/00
See application file for complete search history.

(56) References Cited

U.S. PATENT DOCUMENTS

| | | |
|---|---|---|
| 2007/0230313 A1 | 10/2007 | Kawasumi |
| 2010/0098397 A1 | 4/2010 | Yata |
| 2011/0019066 A1 | 1/2011 | Takano et al. |
| 2013/0002884 A1 | 1/2013 | Nakagawara |
| 2013/0021521 A1 | 1/2013 | Hamada |
| 2013/0242173 A1 | 9/2013 | Kadohara et al. |
| 2015/0124153 A1 | 5/2015 | Hamada |
| 2015/0256737 A1 | 9/2015 | Saito |
| 2018/0176452 A1 | 6/2018 | Nikkanen et al. |

FOREIGN PATENT DOCUMENTS

| | | |
|---|---|---|
| CN | 104956333 A | 9/2015 |
| CN | 106161945 A | 11/2016 |
| CN | 106415348 A | 2/2017 |
| CN | 106464807 A | 2/2017 |
| CN | 106961552 A | 7/2017 |
| CN | 103535021 B | 9/2017 |
| CN | 105657238 B | 9/2017 |
| CN | 107509030 A | 12/2017 |
| CN | 108206914 A | 6/2018 |
| CN | 108496350 A | 9/2018 |

OTHER PUBLICATIONS

Lee et al., "Phase difference detection pixel restoration using adaptive weighted interpolation," 2016 IEEE Region 10 Conference (TENCON), Feb. 9, 2017, pp. 3728-3730.

Chan et al., "Enhancement of Phase Detection for Autofocus," 2017 IEEE International Conference on Image Processing (ICIP), Feb. 22, 2018, pp. 41-45.

Office Action in Chinese Application No. 201811192309.X, dated Oct. 30, 2020, 13 pages.

International Search Report and Written Opinion in International Application No. PCT/CN2019/088971, dated Aug. 16, 2019, 23 pages.

Extended European Search Report issued in European Application No. 19870611.1 dated Oct. 18, 2021, 7 pages.

* cited by examiner

FOCUSING METHOD AND APPARATUS APPLIED TO TERMINAL DEVICE, AND TERMINAL DEVICE

CROSS-REFERENCE TO RELATED APPLICATIONS

This application is a continuation of International Application No. PCT/CN2019.088971, filed on May 29, 2019, which claims priority to Chinese Patent Application No. 201811192309.X, filed on Oct. 12, 2018. The disclosures of the aforementioned applications are hereby incorporated by reference in their entireties.

TECHNICAL FIELD

This application relates to the field of terminal device technologies, and in particular, to a focusing method and apparatus applied to a terminal device, and the terminal device.

BACKGROUND

Currently, a terminal device having a photographing function, for example, a smartphone, a tablet computer, or an unmanned aerial vehicle, can usually take a relatively clear picture when photographing an object in a static scenario. However, in a motion scenario, for example, when a running person is photographed, an image of the person in a photographed picture is often unclear.

To improve definition of a target object (for example, the running person) in photographing, in the prior art, a manner of focusing on a central area is usually used. When the target object is located in a central area of a viewfinder frame, a relatively clear picture may be taken. However, when the target object is in a moving state, the target object usually cannot always be located in the central area. Therefore, when the target object in the motion scenario is photographed in the method of focusing on the central area, a photographed picture is usually relatively blurry, and cannot meet a user requirement.

In the prior art, a method is further provided. An optimized photographing mode, for example, a portrait mode, provided for a motion scenario in a terminal device is manually selected and invoked. However, when this method is used for photographing, a user needs to manually select, in a viewfinder frame, a target object on which focusing needs to be performed, and an operation is complex. In addition, even if an optimized special mode is used, during actual photographing, definition of a photographed picture still cannot meet a user requirement. Therefore, how to take a clear picture of a target object in a motion scenario is a problem that needs to be resolved urgently at present.

SUMMARY

Embodiments of this application provide a focusing method and apparatus applied to a terminal device, and the terminal device, so that a target object can be conveniently photographed, and a clear picture can be taken.

According to a first aspect, an embodiment of this application provides a focusing method applied to a terminal device. The method includes:

detecting whether a current frame includes a target object, where the target object is one of preset objects on which focusing needs to be performed:

when the current frame includes the target object, determining whether the target object is in a motion state;

when the target object is in the motion state, performing tracking focusing by using phase detection (phase detection, PD) with a variable filtering length; and when the target object is in a static state, performing stable focusing by using PD information obtained in an adaptive fixed PD configuration mode.

According to the technical solution provided in the embodiments of this application, the terminal device automatically detects the target object, and determines a status of the target object after detecting the target object. When the target object is in the motion state, the terminal device performs tracking focusing by using the PD information with the variable filtering length. When the target object is in the static state, the terminal device performs stable focusing by using the PD information obtained in the adaptive fixed PD configuration mode. On one hand, because a user does not need to manually select a target object, a user operation is simplified. On the other hand, when a target object is detected, tracking focusing or stable focusing is used based on different statuses of the target object, so that accurate focusing on the target object can be implemented, thereby helping improve definition of a photographed picture.

In some possible implementations, an object on which focusing needs to be performed may be preset. When a photographing function of the terminal device is enabled to obtain the current frame, image recognition is performed on the current frame to determine whether the preset object on which focusing needs to be performed is included.

In some possible implementations, there may be a plurality of preset objects on which focusing needs to be performed. A priority may be set for each object, or a priority may be set for each object with reference to different statuses or photographing scenarios. Through image recognition, if it is detected that the current frame includes two or more than two preset objects on which focusing needs to be performed, one of the objects may be determined as the target object according to a preset filtering rule. The filtering rule may be that selection is performed according to a priority of an object, and an object with a highest priority in a current frame is selected as a target object.

Before the detecting whether a current frame includes a target object, the method further includes:

setting a PD configuration mode as a fixed PD configuration mode by default.

With reference to the first aspect, in some possible implementations, the method further includes:

when the current frame does not include the target object, converting PD information obtained in the fixed PD configuration mode into PD information in a variable PD configuration mode; and performing focusing on the current frame based on the converted PD information.

According to the technical solution provided in the embodiments of this application, the PD information used for focusing is obtained by converting the PD information obtained in the fixed PD configuration mode. In the prior art, a PD is usually set to a variable PD only when the current frame does not include the target object, and there is a delay from setting to obtaining the PD information. However, in this embodiment, there is no delay in the PD information obtained in the conversion manner, and is more timely. Therefore, focusing is more accurate when the focusing method provided in this embodiment is used.

With reference to the first aspect, in some possible implementations, the performing tracking focusing by using phase detection PD information with a variable filtering length includes: predicting a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object.

In some possible implementations, the predicting a focus position of the target object by using a PD data buffer, to obtain a quasi-focus position includes:

obtaining PD information of the current frame;

storing the PD information of the current frame into the PD data buffer;

obtaining target PD information based on PD information of each frame in the PD data buffer; and obtaining the quasi-focus position based on the target PD information.

In some possible implementations, the obtaining target PD information based on PD information of each frame in the PD data buffer includes:

obtaining the PD information of each frame in the PD data buffer;

obtaining, based on PD information of an $i^{th}$ frame and a position of the target object in the $i^{th}$ frame, PD information of the target object corresponding to the $i^{th}$ frame, where the $i^{th}$ frame is any frame in the PD data buffer; and obtaining the target PD information by using the PD information of the target object corresponding to each frame in the PD data buffer.

In some possible implementations, the method further includes:

obtaining a window size of the target object in the current frame;

obtaining a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and comparing the window size of the target object with the size of the target PD block to determine whether the adaptive fixed PD configuration mode needs to be adjusted.

In some possible implementations, the comparing the window size of the target object with the size of the target PD block includes:

if the window size of the target object is smaller than the size of the target PD block, reconfiguring the fixed PD configuration mode based on the window size of the target object, so that a size of a reconfigured target PD block is not greater than the window size of the target object; and the performing stable focusing by using PD information obtained in an adaptive fixed PD configuration mode includes:

performing stable focusing by using PD information obtained in a reconfigured adaptive fixed PD configuration mode.

In some possible implementations, the method further includes: obtaining a window position of the target object in the current frame; and comparing the window position of the target object in the current frame with a position of a target PD block, to determine whether the adaptive fixed PD configuration mode needs to be adjusted, where the target PD block is a PD block with a minimum spacing between a center point of all PD blocks obtained through configuration in the fixed PD configuration mode and a center point of a window of the target object.

In some possible implementations, the comparing the window position of the target object in the current frame with a position of a target PD block includes:

if a spacing between the center point of the window of the target object and a center point of the target PD block is greater than a threshold, adjusting the fixed PD configuration mode based on the window position of the target object for reconfiguration, so that a center point of the reconfigured target PD block overlaps with the center point of the window of the target object or a spacing is less than the threshold; and the performing stable focusing by using PD information obtained in an adaptive fixed PD configuration mode includes:

performing stable focusing by using PD information obtained in a reconfigured adaptive fixed PD configuration mode.

In another implementation, the window size of the target object may also be compared with the size of the target PD block, and the window position of the target object in the current frame is compared with the position of the target PD block.

In some possible implementations, if performing stable focusing by using the PD information is unreliable, for example, after the motor is pushed to a position determined based on the target PD information, an instruction for moving the motor to a different position continues to be received, and a fault occurs when stable focusing is performed by using the PD information. In this case, a contrast focusing technology in the prior art may be used to determine the quasi-focusing position. For example, the motor moves within a specific range, definition obtained for each position based on a contrast is recorded, and a corresponding focus when the definition is the highest is determined as the quasi-focusing position. It should be understood that when the target object is in the static state, the PD information obtained in the adaptive fixed PD configuration mode is preferentially used for stable focusing. Only when a result obtained by performing stable focusing by using the PD information obtained in the adaptive fixed PD configuration mode is unreliable, another technical solution in the prior art is combined. For example, the contrast focusing technology is used to determine the quasi-focus position. According to the technical solution provided in this embodiment, accuracy of the quasi-focus position can be ensured.

According to a second aspect, an embodiment of this application provides a focusing method applied to a terminal device. The method includes:

detecting whether a current frame includes a target object, where the target object is one of preset objects on which focusing needs to be performed;

when the current frame does not include the target object, converting PD information obtained in a fixed PD configuration mode into PD information in a variable PD configuration mode; and performing focusing on the current frame based on the converted PD information.

With reference to the second aspect, in some possible implementations, the method further includes:

when the current frame includes the target object, determining whether the target object is in a motion state;

when the target object is in the motion state, performing tracking focusing by using phase detection PD information with a variable filtering length; and when the target object is in a static state, performing stable focusing by using PD information obtained in an adaptive fixed PD configuration mode.

In some possible implementations, the performing tracking focusing by using phase detection PD information with a variable filtering length includes:

predicting a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object.

In some possible implementations, the predicting a focus position of the target object by using a PD data buffer, to obtain a quasi-focus position includes:

obtaining PD information of the current frame:

storing the PD information of the current frame into the PD data buffer:

obtaining target PD information based on PD information of each frame in the PD data buffer; and obtaining the quasi-focus position based on the target PD information.

In a possible implementation, the method further includes:

obtaining a window size of the target object in the current frame;

obtaining a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and comparing the window size of the target object with the size of the target PD block to determine whether the adaptive fixed PD configuration mode needs to be adjusted.

In some possible implementations, before the detecting whether a current frame includes a target object, the method further includes:

setting a PD configuration mode as the fixed PD configuration mode by default.

In some possible implementations, when the current frame includes two or more than two preset objects on which focusing needs to be performed, one of the objects as the target object is determined according to a preset filtering rule.

According to a third aspect, an embodiment of this application provides a focusing apparatus used in a terminal device. The apparatus includes:

a detection unit, configured to detect whether a current frame includes a target object, where the target object is one of preset objects on which focusing needs to be performed; and a determining unit, configured to: when a detection result of the detection unit is that the current frame includes the target object, determine whether the target object is in a motion state;

a first processing unit, configured to: when a determining result of the determining unit is that the target object is in the motion state, perform tracking focusing by using phase detection PD information with a variable filtering length; and a second processing unit, configured to: when the determining result of the determining unit is that the target object is in a static state, perform stable focusing by using PD information obtained in an adaptive fixed PD configuration mode.

With reference to the third aspect, in some possible implementations, the apparatus further includes:

a third processing unit, configured to: when the detecting unit detects that the current frame does not include the target object, convert PD information obtained in a fixed PD configuration mode into PD information in a variable PD configuration mode; and perform focusing on the current frame based on the converted PD information.

With reference to the third aspect, in some possible implementations, when the first processing unit is configured to perform tracking focusing by using the phase detection PD information with the variable filtering length, the first processing unit is specifically configured to predict a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object.

In some possible implementations, the first processing unit is configured to: obtain PD information of the current frame; store the PD information of the current frame into the PD data buffer; obtain target PD information based on PD information of each frame in the PD data buffer; and obtain the quasi-focus position based on the target PD information.

In some possible implementations, when the first processing unit is configured to obtain the target PD information based on the PD information of each frame in the PD data buffer, the first processing unit is specifically configured to: obtain the PD information of each frame in the PD data buffer; obtain, based on PD information of an $i^{th}$ frame and a position of the target object in the $i^{th}$ frame, PD information of the target object corresponding to the $i^{th}$ frame, where the $i^{th}$ frame is any frame in the PD data buffer; obtain the target PD information by using the PD information of the target object corresponding to each frame in the PD data buffer; and obtain the quasi-focus position based on the target PD information.

With reference to the third aspect, in some possible implementations, when the second processing unit is configured to perform stable focusing by using the PD information obtained in the adaptive fixed PD configuration mode, the second processing unit is specifically configured to:

obtain a window size of the target object in the current frame;

obtain a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and compare the window size of the target object with the size of the target PD block to determine whether the adaptive fixed PD configuration mode needs to be adjusted.

In some possible implementations, the comparing the window size of the target object with the size of the target PD block includes:

if the window size of the target object is smaller than the size of the target PD block, reconfiguring the fixed PD configuration mode based on the window size of the target object, so that a size of a reconfigured target PD block is not greater than the window size of the target object; and the performing stable focusing by using PD information obtained in an adaptive fixed PD configuration mode includes:

performing stable focusing by using PD information obtained in a reconfigured adaptive fixed PD configuration mode.

In some possible implementations, the second processing unit is configured to obtain a window position of the target object in the current frame; and compare the window position of the target object in the current frame with a position of a target PD block, to determine whether the adaptive fixed PD configuration mode needs to be adjusted, where the target PD block is a PD block with a minimum spacing between a center point of all PD blocks obtained through configuration in the fixed PD configuration mode and a center point of a window of the target object.

The comparing the window position of the target object in the current frame with a position of a target PD block includes:

if a spacing between the center point of the window of the target object and a center point of the target PD block is greater than a threshold, adjusting the fixed PD configuration mode based on the window position of the target object for reconfiguration, so that a center point of the reconfigured target PD block overlaps with the center point of the window of the target object or a spacing is less than the threshold.

When the second processing unit is configured to performing stable focusing by using the PD information obtained in the adaptive fixed PD configuration mode, the second processing unit is specifically configured to perform stable focusing by using PD information obtained in a reconfigured adaptive fixed PD configuration mode.

In some possible implementations, the apparatus further includes:

a configuration unit, configured to set a PD configuration mode as the fixed PD configuration mode by default before the detection unit detects whether the current frame includes the target object.

In some possible implementations, when the current frame includes two or more than two preset objects on which focusing needs to be performed, one of the objects as the target object is determined according to a preset filtering rule.

According to a fourth aspect, an embodiment of this application provides a focusing apparatus used in a terminal device, and the apparatus includes:

a detection unit, configured to detect whether a current frame includes a target object, where the target object is one of preset objects on which focusing needs to be performed; and a first processing unit, configured to: when a detection result of the detection unit is that the current frame does not include the target object, convert PD information obtained in a fixed phase detection PD configuration mode into PD information in a variable PD configuration mode; and perform focusing on the current frame based on the converted PD information.

With reference to the fourth aspect, in some possible implementations, the apparatus further includes:

a determining unit, configured to: when a detection result of the detection unit is that the current frame includes the target object, determine whether the target object is in a motion state;

a second processing unit, configured to: when a determining result of the determining unit is that the target object is in the motion state, perform tracking focusing by using PD information with a variable filtering length; and a third processing unit, configured to: when the determining result of the determining unit is that the target object is in a static state, perform stable focusing by using PD information obtained in an adaptive fixed PD configuration mode.

In some possible implementations, when the second processing unit is configured to perform tracking focusing by using the PD information with the variable filtering length, the second processing unit is specifically configured to predict a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object.

In some possible implementations, the second processing unit is configured to: obtain PD information of the current frame; store the PD information of the current frame into the PD data buffer; obtain target PD information based on PD information of each frame in the PD data buffer; and obtain the quasi-focus position based on the target PD information.

In some possible implementations, the third processing unit is specifically configured to: obtain a window size of the target object in the current frame; obtain a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and compare the window size of the target object with the size of the target PD block to determine whether the adaptive fixed PD configuration mode needs to be adjusted.

In some possible implementations, when the second processing unit is configured to predict the focus position of the target object by using the PD data buffer, to obtain the quasi-focus position, the second processing unit is specifically configured to: obtain the PD information of each frame in the PD data buffer; obtain, based on PD information of an $i^{th}$ frame and a position of the target object in the $i^{th}$ frame, PD information of the target object corresponding to the $i^{th}$ frame, where the $i^{th}$ frame is any frame in the PD data buffer; obtain the target PD information by using the PD information of the target object corresponding to each frame in the PD data buffer; and obtain the quasi-focus position based on the target PD information.

In some possible implementations, the third processing unit is specifically configured to: obtain a window size of the target object in the current frame; obtain a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and compare the window size of the target object with the size of the target PD block to determine whether the adaptive fixed PD configuration mode needs to be adjusted.

In some possible implementations, the third processing unit is configured to compare the window position of the target object in the current frame with the position of the target PD block, the third processing unit is specifically configured to: if a spacing between the center point of the window of the target object and a center point of the target PD block is greater than a threshold, adjust the fixed PD configuration mode based on the window position of the target object for reconfiguration, so that a center point of the reconfigured target PD block overlaps with the center point of the window of the target object or a spacing is less than the threshold; and in this case, when the third processing unit is configured to perform stable focusing by using the PD information obtained in the adaptive fixed PD configuration mode, the third processing unit is specifically configured to perform stable focusing by using PD information obtained in a reconfigured adaptive fixed PD configuration mode.

In another implementation, the window size of the target object may also be compared with the size of the target PD block, and the window position of the target object in the current frame is compared with the position of the target PD block.

In some possible implementations, the apparatus further includes:

a configuration unit, configured to set a PD configuration mode as the fixed PD configuration mode by default before the detection unit detects whether the current frame includes the target object.

In some possible implementations, the apparatus is further configured to:

when the current frame includes two or more than two preset objects on which focusing needs to be performed, determine one of the objects as the target object according to a preset filtering rule.

According to a fifth aspect, an embodiment of this application provides a terminal device. The terminal device includes a memory, a processor, and a bus, and the memory and the processor are connected through the bus:

the memory is configured to store a computer program and an instruction; and the processor is configured to invoke the computer program and the instruction that are stored in the memory, to perform the method according to any one of the first aspect or the possible implementations of the first aspect.

With reference to the fifth aspect, in some possible implementations, the terminal device further includes an antenna system, and the antenna system receives/sends a wireless communications signal under control of the processor, to implement wireless communication with a mobile communications network, where the mobile communications network includes one or more of the following: a global system for mobile communications (global system for mobile communication. GSM) network, a code division multiple access (code division multiple access, CDMA) network, a third generation (third Generation, 3G) network, a fourth generation (fourth Generation, 4G) network, a fifth generation digital communications (Fifth Generation, 5G) network, a frequency division multiple access (frequency division multiple access, FDMA) network, a time division multiple access (time division multiple access, TDMA) network, a parking distance control (Parking Distance Control. PDC) system network, a total access communications system (total access communications system, TACS) technology network, an advanced mobile phone system (Advanced Mobile Phone System, AMPS) network, a wideband code division multiple access (wideband code division multiple access, WCDMA) network, a time division-synchronous code division multiple access (time division-synchronous code division multiple access, TDSCDMA) network, a wireless fidelity (wireless fidelity, Wi-Fi) network, and a long term evolution (long term evolution, LTE) network.

According to a sixth aspect, an embodiment of this application provides a terminal device. The terminal device includes a memory, a processor, and a bus, and the memory and the processor are connected through the bus;

the memory is configured to store a computer program and an instruction; and the processor is configured to invoke the computer program and the instruction that are stored in the memory, to perform the method according to any one of the second aspect or the possible implementations of the second aspect.

With reference to the sixth aspect, in some possible implementations, the terminal device further includes an antenna system, and the antenna system receives/sends a wireless communications signal under control of the processor, to implement wireless communication with a mobile communications network, where the mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

According to a seventh aspect, an embodiment of this application provides a computer-readable storage medium, and the computer-readable storage medium stores program code, where the program code includes an instruction used to perform some or all steps of any method according to the first aspect.

According to an eighth aspect, an embodiment of this application provides a computer-readable storage medium, and the computer-readable storage medium stores program code, where the program code includes an instruction used to perform some or all steps of any method according to the second aspect.

According to a ninth aspect, an embodiment of this application provides a computer program product, and when the computer program product runs on a computer, the computer is enabled to perform some or all steps of any method according to the first aspect.

According to a tenth aspect, an embodiment of this application provides a computer program product, and when the computer program product runs on a computer, the computer is enabled to perform some or all steps of any method according to the second aspect.

The technical solutions in the foregoing possible designs may be combined without going against nature.

In the prior art, when focusing is performed on an object in a motion scenario, a manner of focusing on a central area is usually used. When a target object is located in a central area of a viewfinder frame, a relatively clear picture may be taken. However, when the target object is in a moving state, the target object usually cannot always be located in the central area. Therefore, when the target object in the motion scenario is photographed in the method of focusing on the central area, a photographed picture is usually relatively blurry, and cannot meet a user requirement. In another prior art, an optimized photographing mode, for example, an ambilight mode, that is provided for a motion scenario in a terminal device and that is manually selected and invoked is used. However, when this method is used for photographing, a user needs to manually select, in a viewfinder frame, a target object on which focusing needs to be performed, and an operation is complex. In addition, even if an optimized special mode is used, during actual photographing, definition of a photographed picture still cannot meet a user requirement. Therefore, how to take a clear picture of a target object in a motion scenario is a problem that needs to be resolved urgently at present.

According to the technical solution provided in the embodiments of this application, the terminal device automatically detects the target object, and determines a status of the target object after detecting the target object. When the target object is in the motion state, the terminal device performs tracking focusing by using the PD information with the variable filtering length. When the target object is in the static state, the terminal device performs stable focusing by using the PD information obtained in the adaptive fixed PD configuration mode. On one hand, because a user does not need to manually select a target object, a user operation is simplified. On the other hand, when a target object is detected, tracking focusing or stable focusing is used based on different statuses of the target object, so that accurate focusing on the target object can be implemented, thereby helping improve definition of a photographed picture.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the embodiments of this application, the terminal device may be a device that provides a photographing function, for example, a mobile phone (or referred to as a "cellular" phone) that has a photographing function, a smartphone, or may be a portable, pocket-sized, handheld, or wearable device (such as a smartwatch), a tablet computer, a personal computer (PC, Personal Computer), a PDA (Personal Digital Assistant, personal digital assistant), a vehicle-mounted computer, an unmanned aerial vehicle, or an aerial photographer.

Figure 1:
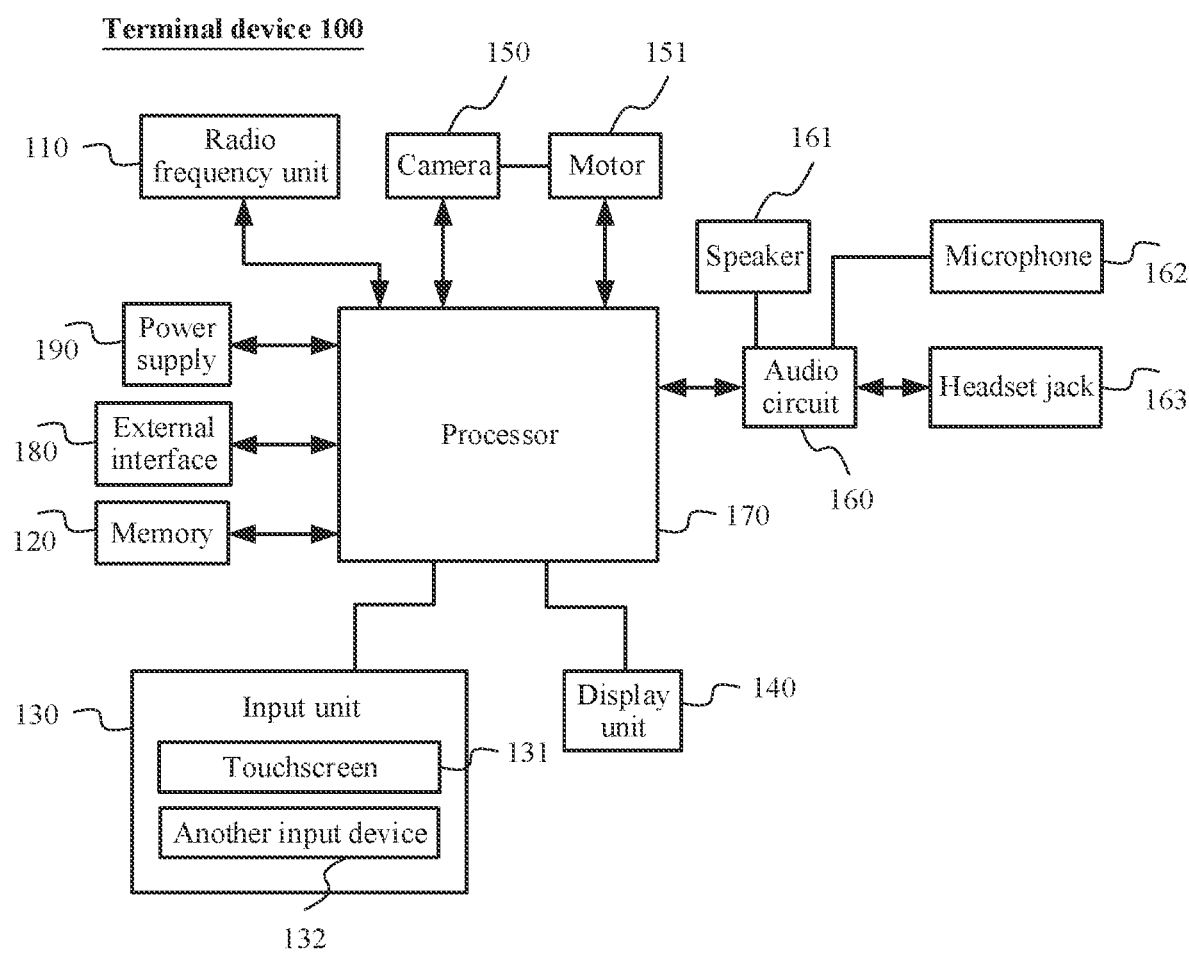
FIG. 1 is a schematic structural diagram of a terminal device according to an embodiment of this application.

FIG. 1 is a schematic diagram of an optional hardware structure of a terminal device 100.

As shown in FIG. 1, the terminal device 100 may include components such as a radio frequency unit 110, a memory 120, an input unit 130, a display unit 140, a camera 150, an audio circuit 160 (including a speaker 161 and a microphone 162), a processor 170, an external interface 180, and a power supply 190. A person skilled in the art may understand that FIG. 1 is merely an example of an intelligent terminal or a multi-functional device, and does not constitute a limitation on the intelligent terminal or the multi-functional device. The intelligent terminal or the multi-functional device may include more or fewer components than those shown in the figure, or combine some components, or include different components. For example, the intelligent terminal or the multi-functional device includes at least the memory 120, the processor 170, and the camera 150.

The camera 150 is configured to collect an image or a video, and may be triggered and enabled through an application program instruction, to implement a photographing function or a video shooting function. The camera may include components such as an imaging lens, a light filter, and an image sensor. Light emitted or reflected by an object enter the imaging lens and finally converge on the image sensor through the light filter. The imaging lens is mainly configured to converge, into an image, light emitted or reflected by all objects (which may also be referred to as a to-be-shot scenario, to-be-shot objects, a target scenario, or target objects, and may also be understood as a scenario image that a user expects to shoot) in a photographing angle of view. The light filter is mainly configured to filter out a redundant light wave (for example, a light wave other than visible light, for example, infrared light) in light rays. The image sensor is mainly configured to perform optical-to-electrical conversion on a received optical signal, convert the optical signal into an electrical signal, and input the electrical signal to the processor 170 for subsequent processing. The camera may be located in front of the terminal device, or may be located on the back of the terminal device. A specific quantity and a specific arrangement manner of cameras may be flexibly determined based on a requirement of a designer or a vendor policy. This is not limited in this application. The motor 151 is connected to the camera 150, and drives to move the camera based on a quasi-focusing position obtained by the processor, to photograph an image in which a target is clearly focused.

The input unit 130 may be configured to receive input digit or character information, and generate a key signal input related to user setting and function control of a portable multi-function apparatus, for example, receiving an object, set by a user, on which focusing needs to be performed or receiving information that PD default configuration mode is set as a fixed PD configuration mode. Specifically, the input unit 130 may include a touchscreen 131 and/or another input device 132. The touchscreen 131 may collect a touch operation (for example, an operation performed by the user on the touchscreen 131 or near the touchscreen 131 by using any proper object, for example, a finger, a joint, or a stylus) of the user on or near the touchscreen 131, and drive a corresponding connection apparatus based on a preset program. The touchscreen may detect a touch action of the user on the touchscreen, convert the touch action into a touch signal, send the touch signal to the processor 170, and can receive and execute a command sent by the processor 170. The touch signal includes at least touch point coordinate information. The touchscreen 131 may provide an input interface and an output interface between the terminal device 100 and the user. In addition, the touchscreen may be implemented in various types such as a resistive type, a capacitive type, an infrared type, and a surface acoustic wave type. In addition to the touchscreen 131, the input unit 130 may further include the another input device. Specifically, the another input device 132 may include but is not limited to one or more of a physical keyboard, a function key (for example, a volume control key or a power on/off key, a trackball, a mouse, a joystick, and the like.

The display unit 140 may be configured to display information input by the user or information provided for the user, various menus of the terminal device 100, an interaction interface, file display, and/or playing of any multimedia file. In the embodiments of the present invention, the display unit is further configured to display a preview image/video obtained by the display device by using the camera 150 in shooting modes, a shot initial image/video obtained by the display device by using the camera 150 in shooting modes, and a target image/video on which a specific algorithm is processed after shooting is performed and that is obtained by the display device by using the camera 150 in shooting modes.

Further, the touchscreen 131 may cover a display panel 141. After detecting the touch operation on or near the touchscreen 131, the touchscreen 131 transfers the touch operation to the processor 170 to determine a type of a touch event. Then, the processor 170 provides a corresponding visual output on the display panel 141 based on the type of the touch event. In this embodiment, the touchscreen and the display unit may be integrated into one component to implement input, output, and display functions of the terminal device 100. For ease of description, in this embodiment of the present invention, a touch display screen represents a function set of the touchscreen and the display unit. In some embodiments, the touchscreen and the display unit may alternatively be used as two independent components.

The memory 120 may be configured to store an instruction and data. The memory 120 may mainly include an instruction storage area and a data storage area. The data storage area may store data such as a media file and a text. The instruction storage area may store software units such as an operating system, an application, and an instruction required by at least one function, or a subset and an extension set of the software units. The memory 120 may further include a non-volatile random access memory and provide the processor 170 with functions including managing hardware, software, and data resources in a computing processing device and supporting control on the software and an application. The memory 120 is further configured to store a multimedia file, and store an execution program and an application.

The processor 170 is a control center of the terminal device 100, and is connected to various parts of an entire mobile phone through various interfaces and lines. The processor 170 performs various functions and data processing of the terminal device 100 by running or executing the instruction stored in the memory 120 and invoking the data stored in the memory 120, to perform overall control on the mobile phone. Optionally, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that the modem processor may alternatively not be integrated into the processor 170. In some embodiments, the processor and the memory may alternatively be implemented on a single chip. In some embodiments, the processor and the memory may respectively be implemented on independent chips. The processor 170 may further be configured to generate a corresponding operation control signal, send the operation control signal to a corresponding component in the computing processing device, and read and process data in software, especially read and process the data and the program in the memory 120. Therefore, functional modules in the processor 170 perform corresponding functions, to control the corresponding component to perform an action as required by an instruction.

The radio frequency unit 110 may be configured to receive and send information or receive and send a signal in a call process. For example, the radio frequency unit 110 receives downlink information from a base station, delivers the downlink information to the processor 170 for processing, and sends related uplink data to the base station. Usually, the RF circuit includes but is not limited to an antenna, at least one amplifier, a transceiver, a coupler, a low noise amplifier (Low Noise Amplifier, LNA), a duplexer, and the like. In addition, the radio frequency unit 110 may further communicate with a network device and another device through wireless communication. Any communications standard or protocol may be used for the wireless communication, including but not limited to GSM, GPRS, CDMA, WCDMA, LTE, an email, a short message service (Short Message Service, SMS), and the like.

The audio circuit 160, the speaker 161, and the microphone 162 may provide an audio interface between the user and the terminal device 100. The audio circuit 160 may transmit, to the speaker 161, an electrical signal converted from received audio data, and the speaker 161 converts the electrical signal into a sound signal for outputting. In addition, the microphone 162 is configured to collect a sound signal, and may further convert the collected sound signal into an electrical signal. The audio circuit 160 receives the electrical signal, converts the electrical signal into audio data, outputs the audio data to the processor 170 for processing, and then sends processed audio data to, for example, another terminal through the radio frequency unit 110, or outputs processed audio data to the memory 120 for further processing. The audio circuit may also include a headset jack 163, configured to provide a connection interface between the audio circuit and a headset.

The terminal device 100 further includes the power supply 190 (for example, a battery) that supplies power to each component. Preferably, the power supply may be logically connected to the processor 170 by using a power management system, to implement functions such as charging, discharging, and power consumption management by using the power management system.

The terminal device 100 further includes the external interface 180. The external interface may be a standard micro-USB port, or may be a multi-pin connector. The external interface may be configured to connect the terminal device 100 to another apparatus for communication, or may be configured to connect to a charger to charge the terminal device 100.

Although not shown, the terminal device 100 may further include a camera flash, a Wi-Fi module, a Bluetooth module, sensors with different functions, and the like. Details are not described herein. Some or all of methods described below may be applied to the terminal device shown in FIG. 1.

The embodiments of this application may be applied to a terminal device that has a photographing function, and an implementation product form may be an intelligent terminal, for example, a product on which a camera is installed, such as a mobile phone, a tablet, a DV, a video camera, a camera, a portable computer, a notebook computer, a smart sound box, or a television. Specifically, functional modules of the present invention are deployed on a DSP chip of a related device, and may specifically be an application program or software in the DSP chip. The present invention is deployed on the terminal device, and provides a focusing function through software installation or upgrade and through hardware invoking and cooperation, to improve accuracy of focusing on a target object, so that a clear picture can be taken in different scenarios.

The embodiments of this application are mainly applied to a scenario in which the terminal device focuses on the target object after enabling a photographing function. The scenario includes but not is not limited to:

Application scenario 1: A photographing shortcut icon on a display interface of the terminal device is tapped.

Application scenario 2: A preset key for enabling a photographing function is triggered.

Application scenario 3: A preset voice for enabling a photographing function is executed.

In these scenarios, the terminal device receives an instruction for enabling the photographing function, and then enables the photographing function. Then, the terminal device automatically detects whether a current frame displayed in a viewfinder frame includes a target object, where the target object is one of preset objects on which focusing needs to be performed. When the current frame includes the target object, whether the target object is in a motion state is determined. When the target object is in the motion state, tracking focusing by using phase detection PD information with a variable filtering length is performed. When the target object is in a static state, stable focusing by using PD information obtained in an adaptive fixed PD configuration mode is performed.

Because detection on the target object does not need to be manually selected by the user, and different methods are used to perform focusing based on different statuses of the target object, focusing is more accurate, and an obtained image is clearer.

The technical solutions provided in the embodiments of this application may be used in all the foregoing application scenarios. The following describes implementations of this application by using examples.

Example 1

Figure 2A:
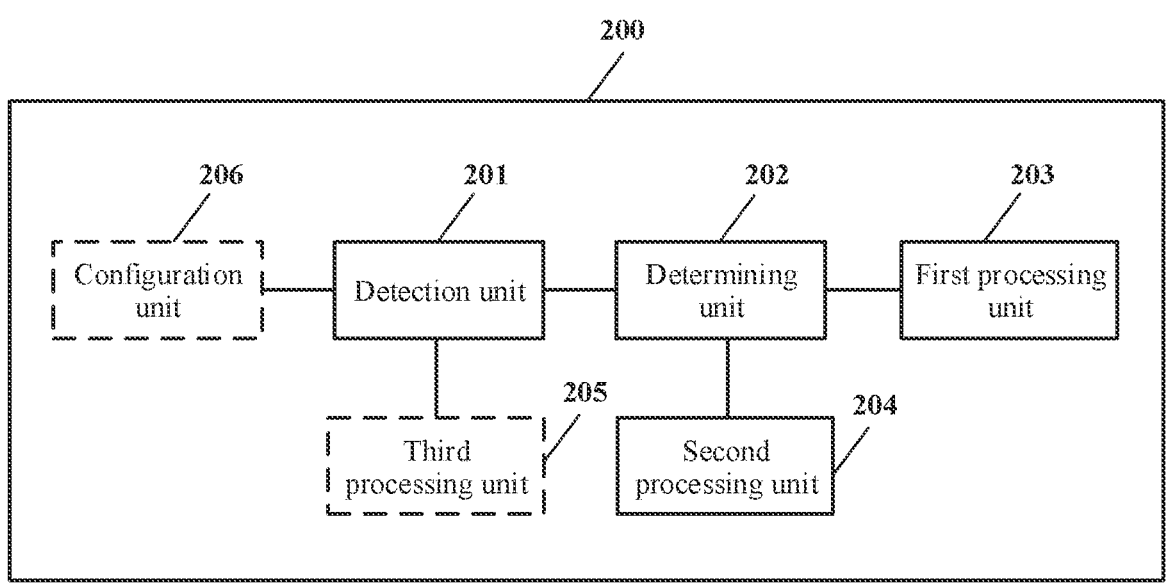
FIG. 2A is a schematic structural diagram of a focusing apparatus according to another embodiment of this application.

A structure of a focusing apparatus 200 used in a terminal device in the present invention is shown in FIG. 2A. The focusing apparatus 200 of the terminal device includes: a detection unit 201, a determining unit 202, a first processing unit 203, a second processing unit 204, and a configuration unit 206. In some possible implementations, the apparatus may further include a third processing unit 205.

Functions of each module are described as follows:

The detection unit 201 is configured to: detect whether a current frame includes a target object, where the target object is one of preset objects on which focusing needs to be performed; and when the current frame includes two or more than two preset objects on which focusing needs to be performed, determine one of the objects as the target object according to a preset filtering rule. For example, if there is only one preset object on which focusing needs to be performed, for example, when there is only a person, whether a current frame includes a person is detected through image recognition. If the current frame includes a person, the person in the current frame is used as a target object. If it is detected that the current frame includes a plurality of persons, one person may be selected from the plurality of persons as a target object according to a preset rule. For example, a person closest to a center point in the current frame may be used as the target object. If there are a plurality of preset objects on which focusing needs to be performed, for example, when there are two objects; a person and a bird, different priorities may be set for the person and the bird. For example, a priority of the person may be set to be higher than a priority of the bird. When it is detected that a current frame includes both the person and the bird, the person with the highest priority is selected as a target object. It may be understood that because the target object is automatically identified by the detection unit 201, and does not need to be manually selected by a user, an operation is more convenient.

The determining unit 202 is configured to: when a detection result of the detection unit is that the current frame includes the target object, determine whether the target object is in a motion state.

The first processing unit 203 is configured to: when a determining result of the detection unit 201 is that the target object is in the motion state, perform tracking focusing by using phase detection PD information with a variable filtering length. The performing tracking focusing by using phase detection PD information with a variable filtering length includes: predicting a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object. It should be noted that the configuration unit 206 is configured to set a PD configuration mode as a fixed PD configuration mode by default before the detection unit detects whether the current frame includes the target object.

An $i^{th}$ frame is used as an example to describe the change rate of the window size of the target object. A window change of the $i^{th}$ frame obtained by subtracting a window size of an $(i-1)^{th}$ frame from a window size of the $i^{th}$ frame is denoted as $\Delta 1$. A window change of the $(i-1)^{th}$ frame obtained by subtracting a window size of an $(i-2)^{th}$ frame from the window size of the $(i-1)^{th}$ frame is denoted as $\Delta 2$. The change rate of the window size of the target object is $\Delta 1/\Delta 2$. If the change rate of the window size of the target object is relatively large, the PD data buffer is relatively small. If the change rate of the window size of the target object is relatively small, the PD data buffer is relatively large.

The window size of the $i^{th}$ frame may be represented by a width and/or a height of the $i^{th}$ frame.

When the first processing unit 203 is configured to predict the focus position of the target object by using the PD data buffer, the first processing unit 203 is specifically configured to: obtain PD information of the current frame; store the PD information of the current frame into the PD data buffer; obtain target PD information based on PD information of each frame in the PD data buffer; and obtain the quasi-focus position based on the target PD information.

The first processing unit 203 is specifically configured to: obtain the PD information of each frame in the PD data buffer; obtain, based on PD information of an $i^{th}$ frame and a position of the target object in the $i^{th}$ frame, PD information of the target object corresponding to the $i^{th}$ frame, where the $i^{th}$ frame is any frame in the PD data buffer; obtain the target PD information by using the PD information of the target object corresponding to each frame in the PD data buffer; and obtain the quasi-focus position based on the target PD information.

The second processing unit 204 is configured to: when a determining result of the determining unit is that the target object is in a static state, perform stable focusing by using PD information obtained in an adaptive fixed PD configuration mode.

When the second processing unit 204 is configured to perform stable focusing by using the PD information obtained in the adaptive fixed PD configuration mode, the second processing unit 204 is specifically configured to obtain a window position and a window size of the target object in the current frame; obtain a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and compare the window size of the target object with the size of the target PD block to determine whether the adaptive fixed PD configuration mode needs to be adjusted.

The comparing the window size of the target object with the size of the target PD block includes: if the window size of the target object is smaller than the size of the target PD block, reconfiguring the fixed PD configuration mode based on the window size of the target object, so that a size of a reconfigured target PD block is not greater than the window size of the target object; and the performing stable focusing by using PD information obtained in an adaptive fixed PD configuration mode includes: performing stable focusing by using PD information obtained in a reconfigured adaptive fixed PD configuration mode.

The second processing unit 204 is configured to compare the window position of the target object in the current frame with a position of a target PD block, and compare the window size of the target object in the current frame with the size of the target PD block, to determine whether the adaptive fixed PD configuration mode needs to be adjusted, where the target PD block is a PD block with a minimum spacing between a center point of all PD blocks obtained through configuration in the fixed PD configuration mode and a center point of a window of the target object.

The comparing the window position of the target object in the current frame with a position of a target PD block includes: if a spacing between the center point of the window of the target object and a center point of the target PD block is greater than a threshold, adjusting the fixed PD configuration mode based on the window position of the target object for reconfiguration, so that a center point of the reconfigured target PD block overlaps with the center point of the window of the target object or a spacing is less than the threshold; and the performing stable focusing by using PD information obtained in an adaptive fixed PD configuration mode includes: performing stable focusing by using PD information obtained in a reconfigured adaptive fixed PD configuration mode.

In another implementation, the window size of the target object may also be compared with the size of the target PD block, and the window position of the target object in the current frame is compared with the position of the target PD block.

The third processing unit 205 is configured to: when the detection unit detects that the current frame does not include the target object, convert PD information obtained in a fixed PD configuration mode into PD information in a variable PD configuration mode; and perform focusing on the current frame based on the converted PD information.

Example 2

Figure 2B:
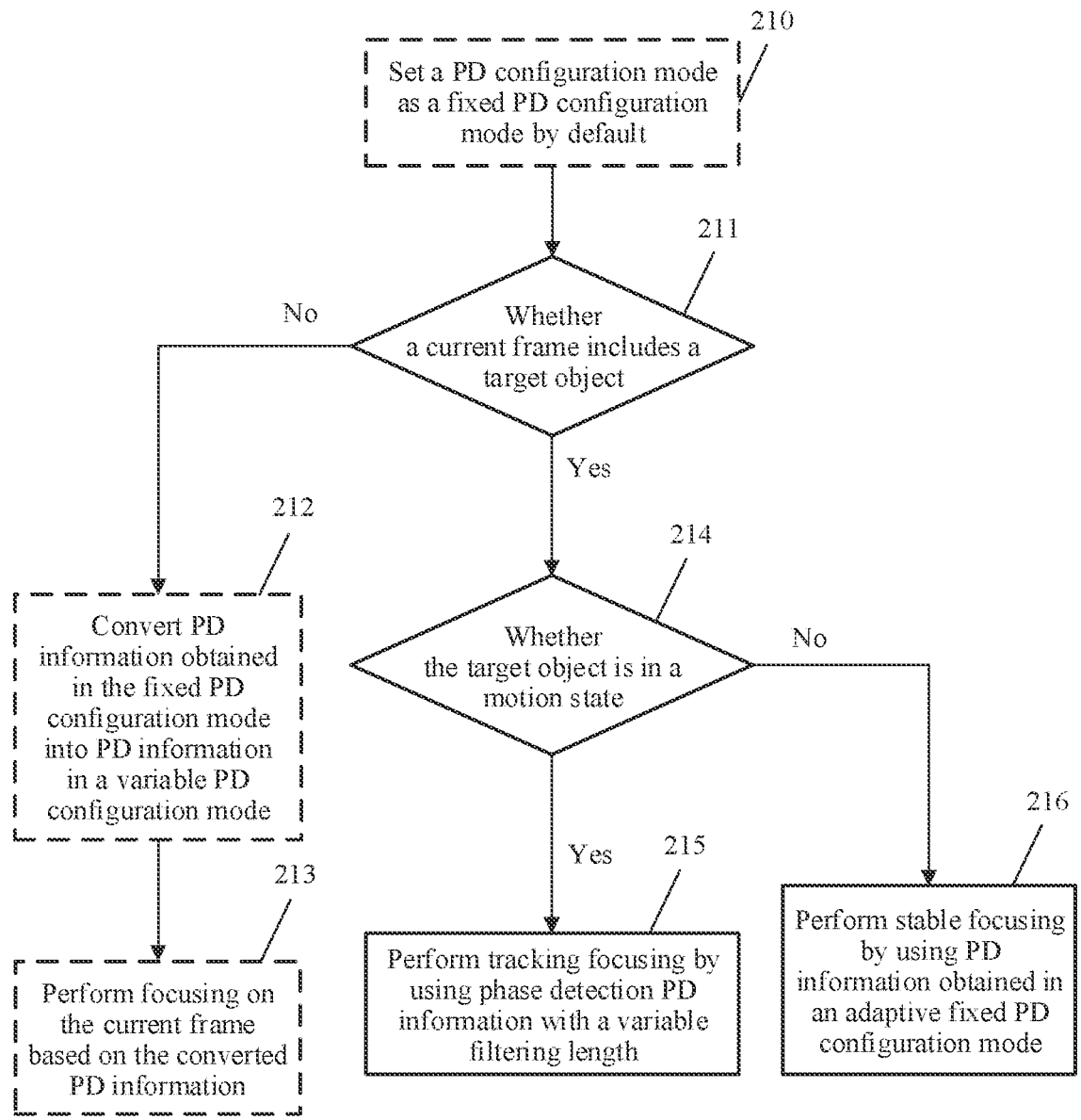
FIG. 2B is a schematic flowchart of a focusing method applied to a terminal device according to another embodiment of this application.

FIG. 2B is a schematic flowchart of a focusing method applied to a terminal device according to an embodiment of this application. In this embodiment, the focusing method may include the following steps.

Step 211: Detect whether a current frame includes a target object.

The target object is one of preset objects on which focusing needs to be performed; and when the current frame includes two or more than two preset objects on which focusing needs to be performed, one of the objects is determined as the target object according to a preset filtering rule. For example, if there is only one preset object on which focusing needs to be performed, for example, when there is only a person, whether a current frame includes a person is detected through image recognition. If the current frame includes a person, the person in the current frame is used as a target object. If it is detected that the current frame includes a plurality of persons, one person may be selected from the plurality of persons as a target object according to a preset rule. For example, a person closest to a center point in the current frame may be used as the target object. If there are a plurality of preset objects on which focusing needs to be performed, for example, when there are two objects: a person and a bird, different priorities may be set for the person and the bird. For example, a priority of the person may be set to be higher than a priority of the bird. When it is detected that a current frame includes both the person and the bird, the person with the highest priority is selected as a target object. It may be understood that because the target object is automatically detected, and does not need to be manually selected by a user, an operation is more convenient.

When a determining result in step 211 is yes, in other words, it is detected that the current frame includes the target object, step 214 is performed.

Step 214: Determine whether the target object is in a motion state.

Whether the target object is in the motion state may be determined based on a change of the target object in each frame. For example, a central position of a target object in each frame of image may be obtained. If a movement of the central position of the target object in three adjacent frames exceeds a threshold, it is determined that the target object is in the motion state.

When a determining result in step 214 is yes, in other words, the target object is in the motion state, step 215 is performed.

When a determining result in step 214 is no, in other words, the target object is in a static state, step 216 is performed.

Step 215: When the target object is in the motion state, perform tracking focusing by using phase detection PD information with a variable filtering length.

Step 216: When the target object is in the static state, perform stable focusing by using PD information obtained in an adaptive fixed PD configuration mode.

According to the technical solution provided in the embodiments of this application, the terminal device automatically detects the target object, and determines a status of the target object after detecting the target object. When the target object is in the motion state, the terminal device performs tracking focusing by using the PD information with the variable filtering length. When the target object is in the static state, the terminal device performs stable focusing by using the PD information obtained in the adaptive fixed PD configuration mode. On one hand, because a user does not need to manually select a target object, a user operation is simplified. On the other hand, when a target object is detected, tracking focusing or stable focusing is used based on different statuses of the target object, so that accurate focusing on the target object can be implemented, thereby helping improve definition of a photographed picture.

In some possible implementations of this application, as shown in a dashed-line box indicated in step 210 in FIG. 2B, before step 211, step 210 is further included.

Step 210: Set a PD configuration mode as a fixed configuration mode by default.

It should be noted that configuring the PD includes setting a PD block. For example, an area corresponding to a viewfinder frame may be set to four rows and three columns, including 12 small areas, and each small area is one PD block. In this case, each frame of image corresponds to 12 PD values, and PD information of the target object is obtained based on PD data corresponding to a PD block covered by the target object. Target PD information may be obtained based on the PD information of the target object in each frame included in a data buffer area. A quasi-focus position may be obtained based on the target PD information of the target object, and the motor is driven to move, based on the quasi-focus position, to place the target object in the quasi-focus position.

In some possible implementations of this application, as shown in a dashed-line box indicated in step 212 and a dashed-line box indicated in step 213 in FIG. 2B, when a determining result in step 211 is no, in other words, it is detected that the current frame does not include the target object, step 212 and step 213 are performed.

Step 212: Convert PD information obtained in the fixed PD configuration mode into PD information in a variable PD configuration mode.

In this embodiment, the PD information used for focusing is obtained by converting the PD information obtained in the fixed PD configuration mode. In the prior art, a PD is usually set to a variable PD only when the current frame does not include the target object, and there is a delay from setting to obtaining the PD information in the prior art. However, in this embodiment, there is no delay in the PD information obtained in the conversion manner, and focusing can be performed in a more timely manner by using this technical feature, thereby helping improve focusing accuracy.

Step 213: Perform focusing on the current frame based on the converted PD information.

Example 3

Figure 2C:
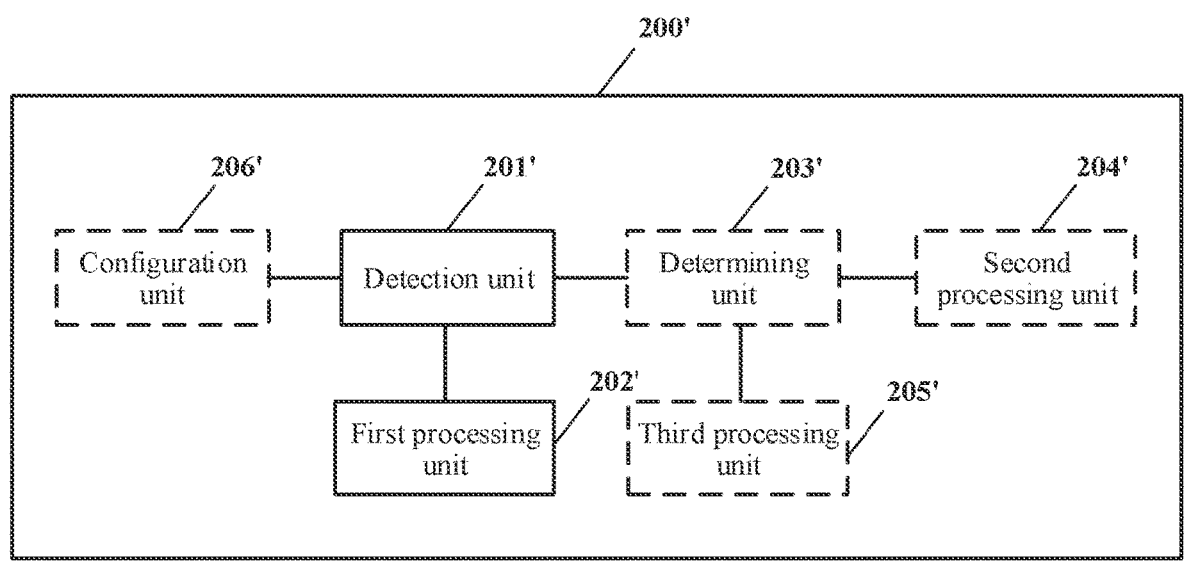
FIG. 2C is a schematic structural diagram of a focusing apparatus according to another embodiment of this application.

A structure of a focusing apparatus 200' used in a terminal device in the present invention is shown in FIG. 2C. The focusing apparatus 200' of the terminal device includes a detection unit 201' and a first processing unit 202'.

Functions of each module are described as follows:

The detection unit 201' is configured to: detect whether a current frame includes a target object, where the target object is one of preset objects on which focusing needs to be performed; and when the current frame includes two or more than two preset objects on which focusing needs to be performed, determine one of the objects as the target object according to a preset filtering rule. For example, if there is only one preset object on which focusing needs to be performed, for example, when there is only a person, whether a current frame includes a person is detected through image recognition. If the current frame includes a person, the person in the current frame is used as a target object. If it is detected that the current frame includes a plurality of persons, one person may be selected from the plurality of persons as a target object according to a preset rule. For example, a person closest to a center point in the current frame may be used as the target object. If there are a plurality of preset objects on which focusing needs to be performed, for example, when there are two objects: a person and a bird, different priorities may be set for the person and the bird. For example, a priority of the person may be set to be higher than a priority of the bird. When it is detected that a current frame includes both the person and the bird, the person with the highest priority is selected as a target object. It may be understood that because the target object is automatically identified by the detection unit 201', and does not need to be manually selected by the user, an operation is more convenient.

The first processing unit 202' is configured to: when a detection result of the detection unit is that the current frame does not include the target object, convert PD information obtained in a fixed phase detection PD configuration mode into PD information in a variable PD configuration mode; and perform focusing on the current frame based on the converted PD information.

In some possible implementations, the focusing apparatus 200' of the terminal device further includes a determining unit 203' a second processing unit 204', and a third processing unit 205'.

The determining unit 203' is configured to: when a detection result of the detection unit is that the current frame includes the target object, determine whether the target object is in a motion state.

The second processing unit 204' is configured to: when a determining result of the determining unit is that the target object is in the motion state, perform tracking focusing by using PD information with a variable filtering length.

The third processing unit 205' is configured to: when a determining result of the determining unit is that the target object is in a static state, perform stable focusing by using PD information obtained in an adaptive fixed PD configuration mode.

When the second processing unit 204' is configured to perform tracking focusing by using the PD information with the variable filtering length, the second processing unit 204' is specifically configured to predict a focus position of the target object by using a PD data buffer, to obtain a quasi-focus position, where the quasi-focus position is used by the terminal device to drive a motor of the terminal device to move, and a size of the PD data buffer is inversely proportional to a change rate of a window size of the target object. The second processing unit 204' is configured to: obtain PD information of the current frame; store the PD information of the current frame into the PD data buffer; obtain target PD information based on PD information of each frame in the PD data buffer; and obtain the quasi-focus position based on the target PD information.

The third processing unit 205' is specifically configured to: obtain a window size of the target object in the current frame; obtain a size of a target PD block obtained through configuration in the fixed PD configuration mode, where the target PD block is a PD block with a minimum spacing between a center point of all PD blocks obtained through configuration in the fixed PD configuration mode and a center point of a window of the target object; and compare the window size of the target object with the size of the target PD block to determine whether the adaptive fixed PD configuration mode needs to be adjusted.

The comparing the window size of the target object with the size of the target PD block includes: if the window size of the target object is smaller than the size of the target PD block, reconfiguring the fixed PD configuration mode based on the window size of the target object, so that a size of a reconfigured target PD block is not greater than the window size of the target object; and in this case, when the third processing unit 205' is configured to perform stable focusing by using the PD information obtained in the adaptive fixed PD configuration mode, the third processing unit 205' is specifically configured to perform stable focusing by using PD information obtained in a reconfigured adaptive fixed PD configuration mode.

In some possible implementations, the third processing unit 205' is configured to obtain a window position of the target object in the current frame; and compare the window position of the target object in the current frame with a position of a target PD block, to determine whether the adaptive fixed PD configuration mode needs to be adjusted, where the target PD block is a PD block with a minimum spacing between a center point of all PD blocks obtained through configuration in the fixed PD configuration mode and a center point of a window of the target object.

In some possible implementations, the third processing unit 205' is configured to compare the window position of the target object in the current frame with the position of the target PD block, the third processing unit 205' is specifically configured to: if a spacing between the center point of the window of the target object and a center point of the target PD block is greater than a threshold, adjust the fixed PD configuration mode based on the window position of the target object for reconfiguration, so that a center point of the reconfigured target PD block overlaps with the center point of the window of the target object or a spacing is less than the threshold; and in this case, when the third processing unit 205' is configured to perform stable focusing by using the PD information obtained in the adaptive fixed PD configuration mode, the third processing unit 205' is specifically configured to perform stable focusing by using PD information obtained in a reconfigured adaptive fixed PD configuration mode.

In another implementation, the window size of the target object may also be compared with the size of the target PD block, and the window position of the target object in the current frame is compared with the position of the target PD block.

In some possible implementations, the focusing apparatus 200' of the terminal device further includes a configuration unit 206'. The configuration unit 206' is configured to set a PD configuration mode as the fixed PD configuration mode by default before the detection unit detects whether the current frame includes the target object.

Example 4

Figure 2D:
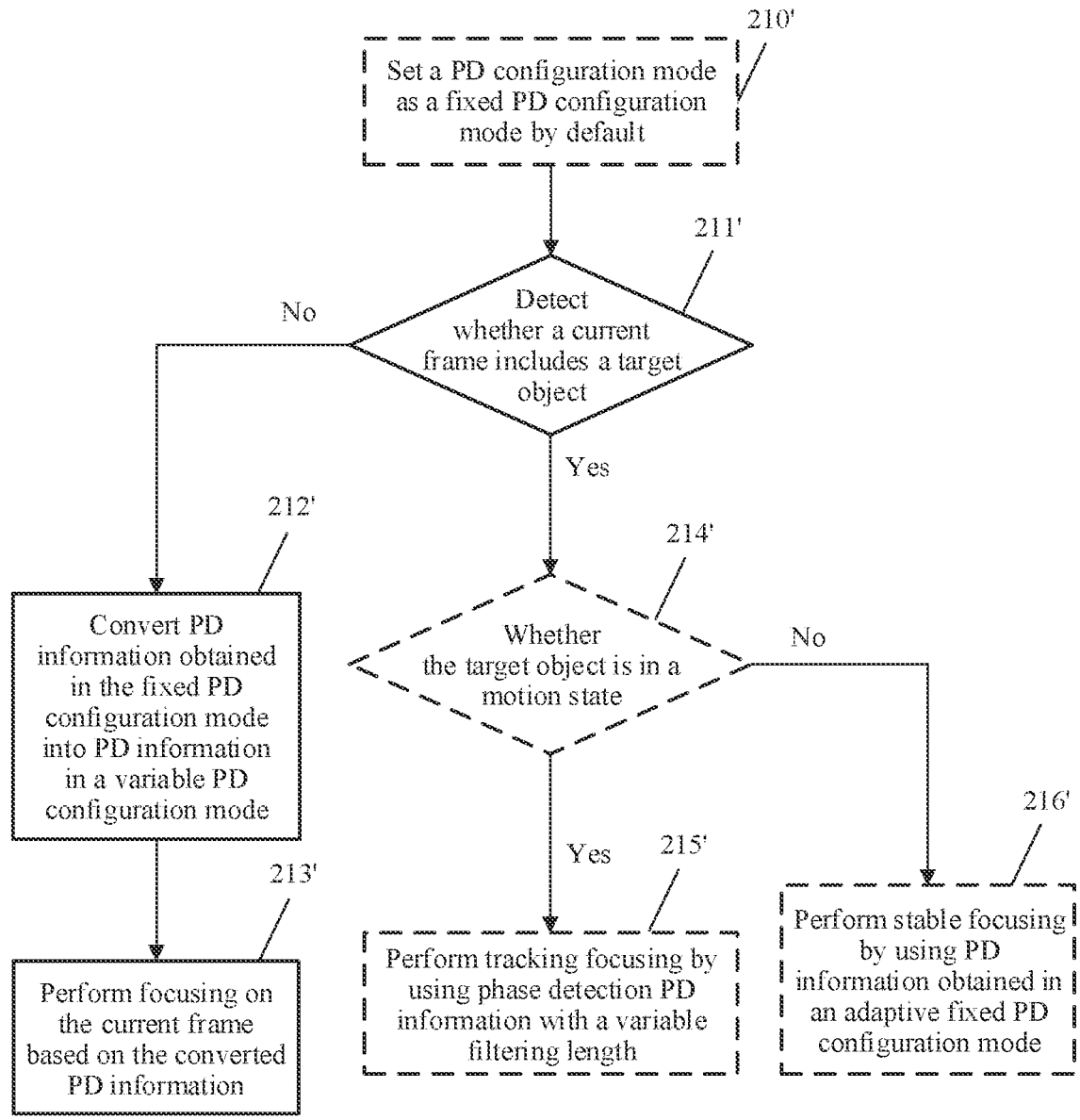
FIG. 2D is a schematic structural diagram of a terminal device according to an embodiment of this application.

FIG. 2D is a schematic flowchart of a focusing method applied to a terminal device according to an embodiment of this application. In this embodiment, the focusing method may include the following steps.

Step 211'. Detect whether a current frame includes a target object.

The target object is one of preset objects on which focusing needs to be performed; and when the current frame includes two or more than two preset objects on which focusing needs to be performed, one of the objects is determined as the target object according to a preset filtering rule. For example, if there is only one preset object on which focusing needs to be performed, for example, when there is only a person, whether a current frame includes a person is detected through image recognition. If the current frame includes a person, the person in the current frame is used as a target object. If it is detected that the current frame includes a plurality of persons, one person may be selected from the plurality of persons as a target object according to a preset rule. For example, a person closest to a center point in the current frame may be used as the target object. If there are a plurality of preset objects on which focusing needs to be performed, for example, when there are two objects: a person and a bird, different priorities may be set for the person and the bird. For example, a priority of the person may be set to be higher than a priority of the bird. When it is detected that a current frame includes both the person and the bird, the person with the highest priority is selected as a target object. It may be understood that because the target object is automatically detected, and does not need to be manually selected by a user, an operation is more convenient.

When a determining result in step 211' is no, in other words, it is detected that the current frame does not include the target object, step 212' is performed.

Step 212': Convert PD information obtained in the fixed PD configuration mode into PD information in a variable PD configuration mode.

Step 213': Perform focusing on the current frame based on the converted PD information.

In this embodiment, the PD information used for focusing is obtained by converting the PD information obtained in the fixed PD configuration mode. In the prior art, a PD is usually set to a variable PD only when the current frame does not include the target object, and there is a delay from setting to obtaining the PD information in the prior art. However, in this embodiment, there is no delay in the PD information obtained in the conversion manner, and focusing can be performed in a more timely manner by using this technical feature, thereby helping improve focusing accuracy.

In some possible implementations of this application, as shown in dashed-line boxes indicated in step 214', step 215', and step 216' in FIG. 2D, when a determining result in step 21' is that the current frame includes the target object, step 214' is performed.

Step 214': Determine whether the target object is in a motion state.

Whether the target object is in the motion state may be determined based on a change of the target object in each frame. For example, a central position of a target object in each frame of image may be obtained. If a movement of the central position of the target object in three adjacent frames exceeds a threshold, it is determined that the target object is in the motion state.

When a determining result in step 214' is yes, in other words, the target object is in the motion state, step 215' is performed.

When a determining result in step 214' is no, in other words, the target object is in a static state, step 216' is performed.

Step 215': When the target object is in the motion state, perform tracking focusing by using phase detection PD information with a variable filtering length.

Step 216': When the target object is in the static state, perform stable focusing by using PD information obtained in an adaptive fixed PD configuration mode.

According to the technical solution provided in the embodiments of this application, the terminal device automatically detects the target object, and determines a status of the target object after detecting the target object. When the target object is in the motion state, the terminal device performs tracking focusing by using the PD information with the variable filtering length. When the target object is in the static state, the terminal device performs stable focusing by using the PD information obtained in the adaptive fixed PD configuration mode. On one hand, because a user does not need to manually select a target object, a user operation is simplified. On the other hand, when a target object is detected, tracking focusing or stable focusing is used based on different statuses of the target object, so that accurate focusing on the target object can be implemented, thereby helping improve definition of a photographed picture.

In some possible implementations of this application, as shown in a dashed-line box indicated in step 210' in FIG. 2D, before step 211', step 210' is further included.

Step 210': Set a PD configuration mode as a fixed configuration mode by default.

It should be noted that configuring the PD includes setting a PD block. For example, an area corresponding to a viewfinder frame may be set to four rows and three columns, including 12 small areas, and each small area is one PD block. In this case, each frame of image corresponds to 12 PD values, and PD information of the target object is obtained based on PD data corresponding to a PD block covered by the target object. Target PD information may be obtained based on the PD information of the target object in each frame included in a data buffer area. A quasi-focus position may be obtained based on the target PD information of the target object, and the motor is driven to move, based on the quasi-focus position, to place the target object in the quasi-focus position.

Example 5

Figure 3A:
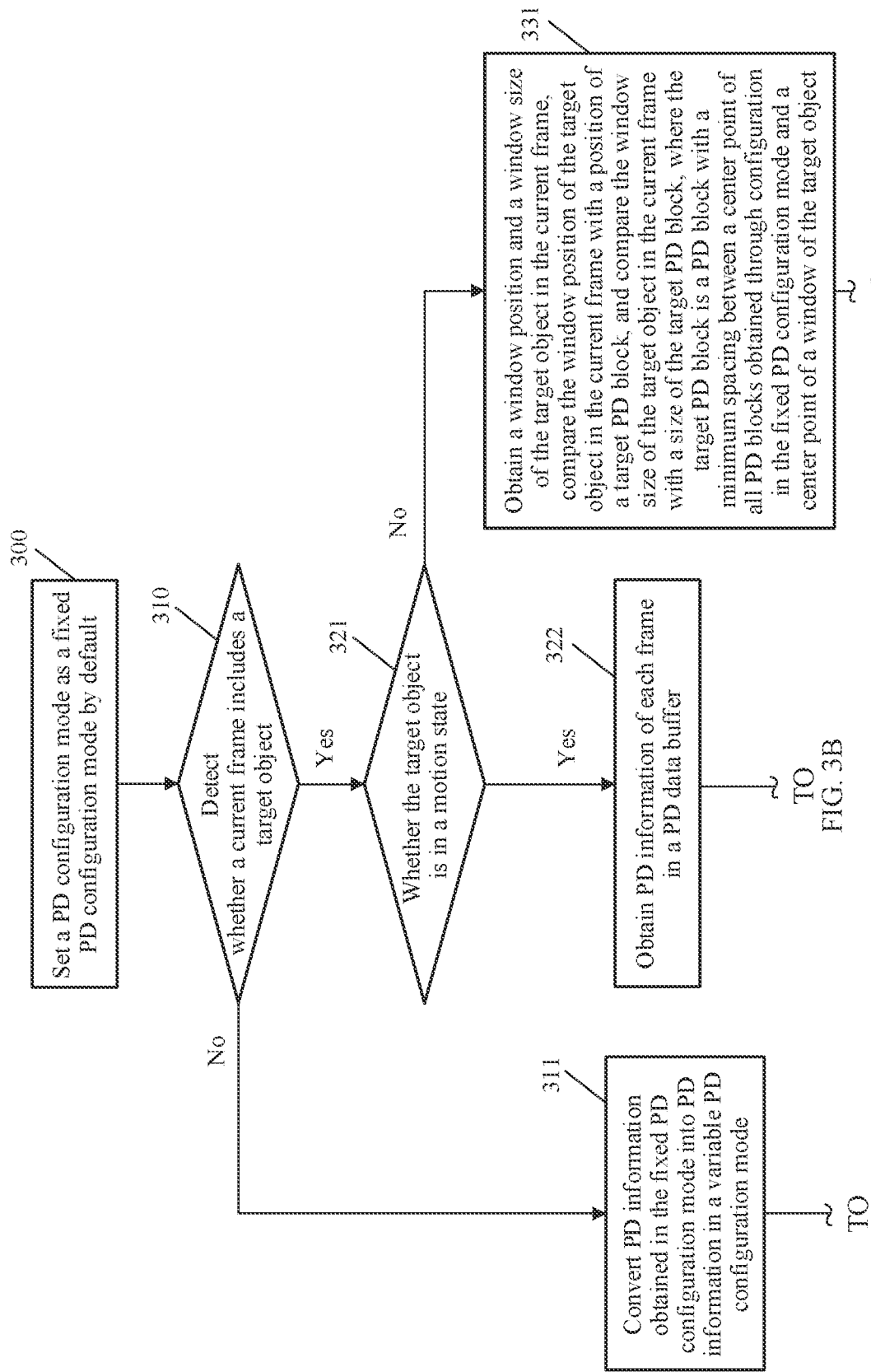
FIG. 3A, FIG. 3B, and FIG. 3C are a schematic flowchart of a focusing method applied to a terminal device according to another embodiment of this application.
Figure 3B:
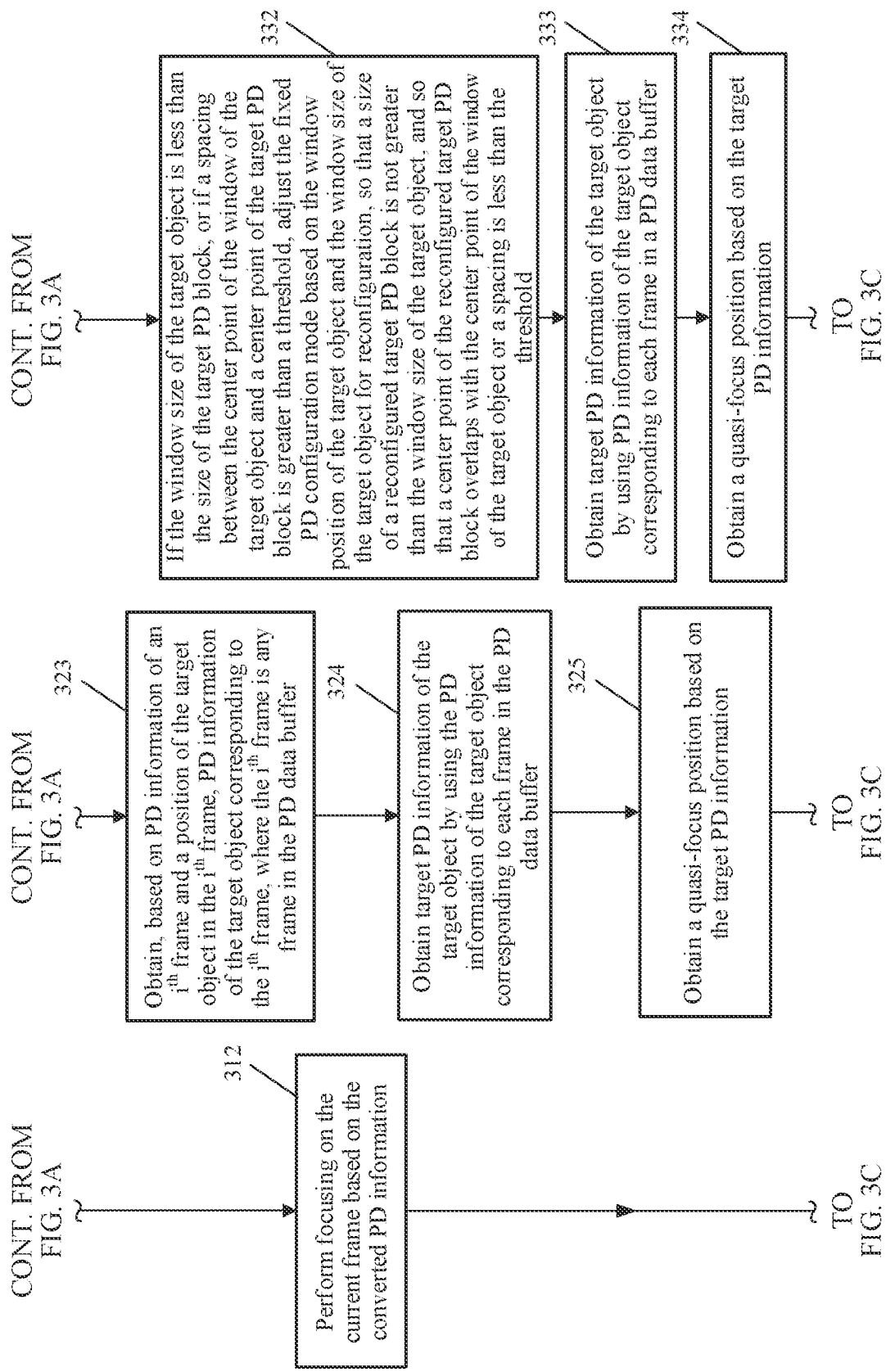
Figure 3C:
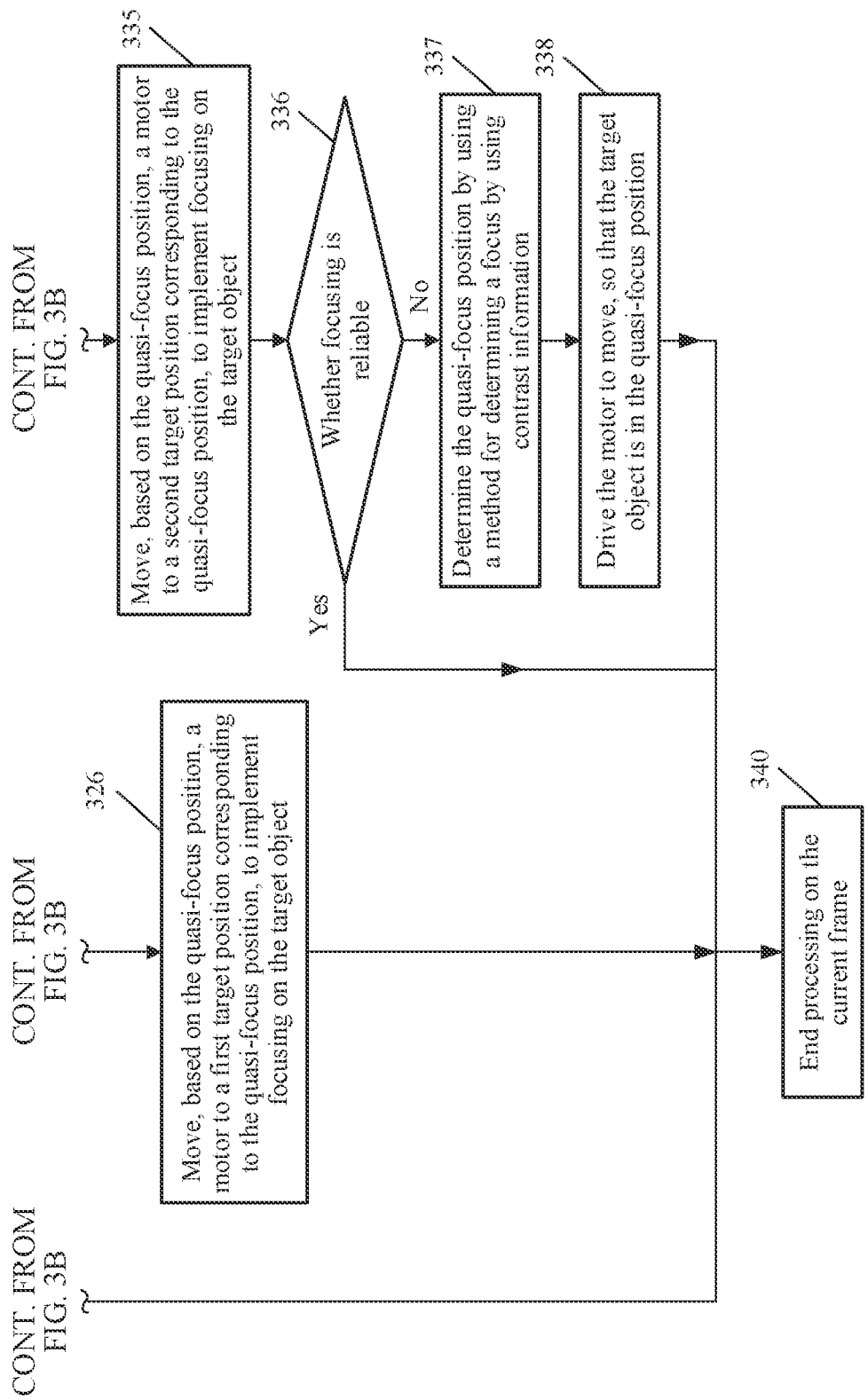

FIG. 3A, FIG. 3B, and FIG. 3C is a schematic flowchart of a focusing method applied to a terminal device according to an embodiment of this application. In this embodiment, the focusing method may include the following steps.

Step 300: Set a PD configuration mode as a fixed configuration mode by default.

It should be noted that configuring the PD includes setting a PD block. For example, an area corresponding to a viewfinder frame may be set to four rows and three columns, including 12 small areas, and each small area is one PD block. In this case, each frame of image corresponds to 12 PD values, and PD information of the target object is obtained based on PD data corresponding to a PD block covered by the target object. Target PD information may be obtained based on the PD information of the target object in each frame included in a data buffer area. A quasi-focus position may be obtained based on the target PD information of the target object, and the motor is driven to move, based on the quasi-focus position, to place the target object in the quasi-focus position.

Step 310: Detect whether a current frame includes a target object.

The target object is one of preset objects on which focusing needs to be performed; and when the current frame includes two or more than two preset objects on which focusing needs to be performed, one of the objects is determined as the target object according to a preset filtering rule. For example, if there is only one preset object on which focusing needs to be performed, for example, when there is only a person, whether a current frame includes a person is detected through image recognition. If the current frame includes a person, the person in the current frame is used as a target object. If it is detected that the current frame includes a plurality of persons, one person may be selected from the plurality of persons as a target object according to a preset rule. For example, a person closest to a center point in the current frame may be used as the target object. If there are a plurality of preset objects on which focusing needs to be performed, for example, when there are two objects; a person and a bird, different priorities may be set for the person and the bird. For example, a priority of the person may be set to be higher than a priority of the bird. When it is detected that a current frame includes both the person and the bird, the person with the highest priority is selected as a target object. It may be understood that because the target object is automatically detected, and does not need to be manually selected by a user, an operation is more convenient.

When a determining result in step 310 is no, in other words, it is detected that the current frame does not include the target object, step 311 and step 312 are performed.

When a determining result in step 310 is yes, in other words, it is detected that the current frame includes the target object, step 321 is performed.

Step 311: Convert PD information obtained in the fixed PD configuration mode into PD information in a variable PD configuration mode.

In this embodiment, the PD information used for focusing is obtained by converting the PD information obtained in the fixed PD configuration mode. In the prior art, a PD is usually set to a variable PD only when the current frame does not include the target object, and there is a delay from setting to obtaining the PD information in the prior art. However, in this embodiment, there is no delay in the PD information obtained in the conversion manner, and focusing can be performed in a more timely manner by using this technical feature, thereby helping improve focusing accuracy.

Step 312: Perform focusing on the current frame based on the converted PD information.

Step 321: Determine whether the target object is in a motion state.

Whether the target object is in the motion state may be determined based on a change of the target object in each frame. For example, a central position of a target object in each frame of image may be obtained. If a movement of the central position of the target object in three adjacent frames exceeds a threshold, it is determined that the target object is in the motion state.

Step 322: When the target object is in the motion state, obtain PD information of each frame in the PD data buffer.

Step 323: Obtain, based on PD information of an $i^{th}$ frame and a position of the target object in the $i^{th}$ frame, PD information of the target object corresponding to the $i^{th}$ frame, where the $i^{th}$ frame is any frame in the PD data buffer.

Step 324: Obtain the target PD information by using the PD information of the target object corresponding to each frame in the PD data buffer.

In this embodiment of this application, a size of the data buffer may be changed. When a change rate of a window size of the target object is greater than a first threshold, the size of the PD data buffer is decreased. When a change rate of a window size of the target object is less than a second threshold, the size of the PD data buffer is increased. For example, when the target object moves relatively fast, a change rate of a window size of the target object is usually relatively fast. Decreasing the size of the PD data buffer helps track a change trend of the target object more accurately. When the target object moves relatively slowly, a change rate of a window size of the target object is usually relatively slow. Increasing the size of the PD data buffer helps improve accuracy of the quasi-focus position.

Step 325: Obtain the quasi-focus position based on the target PD information.

Step 326: Move, based on the quasi-focus position, the motor to a first target position corresponding to the quasi-focus position, to implement focusing on the target object.

Step 331: Obtain a window position and a window size of the target object in the current frame, compare the window position of the target object in the current frame with a position of a target PD block, and compare the window size of the target object in the current frame with a size of the target PD block, where the target PD block is a PD block with a minimum spacing between a center point of all PD blocks obtained through configuration in the fixed PD configuration mode and a center point of a window of the target object.

Step 332: If the window size of the target object is less than the size of the target PD block, or if a spacing between the center point of the window of the target object and a center point of the target PD block is greater than a threshold, adjust the fixed PD configuration mode based on the window position of the target object and the window size of the target object for reconfiguration, so that a size of a reconfigured target PD block is not greater than the window size of the target object, and so that a center point of the reconfigured target PD block overlaps with the center point of the window of the target object or a spacing is less than the threshold.

Step 333: Obtain the target PD information by using PD information of the target object corresponding to each frame in a PD data buffer.

Step 334: Obtain the quasi-focus position based on the target PD information.

Step 335: Move, based on the quasi-focus position, the motor to a second target position corresponding to the quasi-focus position, to implement focusing on the target object.

Step 336: Determine whether focusing is reliable.

If a determining result in step 336 is yes, step 340 is performed, and processing on the current frame ends; or if a determining result in step 336 is no, step 337 is performed.

Step 337: Determine the quasi-focus position by using a method for determining a focus by using a contrast focusing technology.

Step 338: Drive the motor to move, so that the target object is in the quasi-focus position.

It may be understood that, in this embodiment, a manner of performing focusing based on the PD information is preferentially used. When a quasi-focus position determined by using the PD information is unreliable, another method may be used to determine the quasi-focus position. For example, the method for determining the focus by using the contrast focusing technology is used to determine the quasi-focus position. For example, when the target object is in a static state, if focusing is performed based on the PD information to obtain a target position of the motor, the motor is pushed to the target position. When the target object is static, the quasi-focus position should remain unchanged. For example, if the target position corresponding to the motor is S1, the motor has been pushed to S1. If a result obtained based on the PD information indicates that the motor further needs to be pushed to move, and the motor needs to be continuously pushed to move for several consecutive frames, for example, indicating that the motor is pushed to a position S2 and a position S3 that are different from the position S1, performing stable focusing by using the PD information currently is unreliable, and step 337 is performed. The method for determining the focus by using the contrast focusing technology refers to pushing the motor within a specific range, for example, pushing the motor from P1, P2, P3, . . . , to P20 in sequence. In this process, if there is a clearest image, the clearest image is recorded, and a position of the motor at this time is also recorded. For example, when the motor moves to the P12, a target object in a viewfinder frame is the clearest. In this case, after the motor moves to the P20, the motor is driven to move to the P12.

When the target object is static, if a position indicated by a subsequently received instruction is always the current position of the motor after focusing is performed based on the PD information, focusing is reliable, and processing on the current frame ends.

An embodiment of this application further provides a terminal device. The terminal device includes a memory, a processor, and a bus, and the memory and the processor are connected through the bus;

the memory is configured to store a computer program and an instruction; and the processor is configured to invoke the computer program and the instruction that are stored in the memory, to perform some or all of the foregoing steps of the focusing method applied to the terminal device.

In some possible implementations, the terminal device further includes an antenna system, and the antenna system receives/sends a wireless communications signal under control of the processor, to implement wireless communication with a mobile communications network, where the mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

An embodiment of this application further provides a computer-readable storage medium, and the computer-readable storage medium stores program code, where the program code includes an instruction used to perform some or all of the foregoing steps of the focusing method applied to the terminal device.

An embodiment of this application further provides a computer program product, and when the computer program product runs on a computer, the computer is enabled to execute an instruction of some or all steps of the focusing method performed by the terminal device.

The foregoing specific method examples, explanations and descriptions of technical features in the embodiments, and extensions of a plurality of implementation forms are also applicable to method execution in the apparatus, and details are not described in the apparatus embodiments.

It should be understood that division into the modules in the foregoing apparatus is merely logical function division. In an actual implementation, some or all of the modules may be integrated into one physical entity, or may be physically separated. For example, each of the foregoing modules may be a separate processing element, or may be integrated on a chip of a terminal, or may be stored in a storage element of a controller in a form of program code. A processing element of the processor invokes and executes a function of each of the foregoing modules. In addition, the modules may be integrated or may be implemented independently. The processing element may be an integrated circuit chip and has a signal processing capability. In an implementation process, steps in the foregoing methods or the foregoing modules can be implemented by using a hardware integrated logical circuit in the processing element, or by using instructions in a form of software. The processing element may be a general-purpose processor, for example, a central processing unit (central processing unit CPU), or may be one or more integrated circuits configured to implement the foregoing method, for example, one or more application-specific integrated circuits (application-specific integrated circuit, ASIC), one or more microprocessors (digital signal processor, DSP), one or more field-programmable gate arrays (field-programmable gate array, FPGA), or the like.

It should be understood that the terms "first", "second", and the like in the specification, claims, and accompanying drawings of the present invention are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include". "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention. Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A focusing method applied to a terminal device, wherein the method comprises:
   detecting whether a current frame comprises a target object, wherein the target object is one of preset objects on which focusing needs to be performed;
   in response to detecting that the current frame comprises the target object, determining whether the target object is in a motion state; and
   in response to determining that the target object is in the motion state, performing tracking focusing by using phase detection (PD) information with a variable filtering length; and
   in response to determining that the target object is in a static state, performing stable focusing by using PD information obtained in an adaptive fixed PD configuration mode.

2. The method according to claim 1, wherein the method further comprises:
   in response to detecting that the current frame does not comprise the target object:
      converting PD information obtained in a fixed PD configuration mode into PD information in a variable PD configuration mode; and
      performing focusing on the current frame based on the converted PD information.

3. The method according to claim 1, wherein performing the tracking focusing by using the PD information with the variable filtering length comprises:
   predicting a focus position of the target object to obtain a quasi-focus position by using a PD data buffer, wherein the quasi-focus position is used by the terminal device to drive a motor of the terminal device to move, and wherein a size of the PD data buffer is inversely proportional to a change rate of a window size of the target object.

4. The method according to claim 3, wherein predicting the focus position of the target object to obtain the quasi-focus position by using the PD data buffer comprises:
   obtaining PD information of the current frame;
   storing the PD information of the current frame into the PD data buffer;
   obtaining target PD information based on PD information of each frame in the PD data buffer; and
   obtaining the quasi-focus position based on the target PD information.

5. The method according to claim 4, wherein obtaining the target PD information based on the PD information of each frame in the PD data buffer comprises:
   obtaining the PD information of each frame in the PD data buffer;
   obtaining, based on PD information of an $i^{th}$ frame and a position of the target object in the $i^{th}$ frame, PD information of the target object corresponding to the i$^{th}$ frame, wherein the i$^{th}$ frame is a frame in the PD data buffer; and obtaining the target PD information by using the PD information of the target object corresponding to each frame in the PD data buffer.

6. The method according to claim 1, further comprising:
obtaining a window size of the target object in the current frame;

obtaining a size of a target PD block obtained through a configuration in the adaptive fixed PD configuration mode, wherein the target PD block is a PD block with a minimum spacing between a center point of all PD blocks obtained through the configuration in the adaptive fixed PD configuration mode and a center point of a window of the target object; and comparing the window size of the target object with the size of the target PD block to determine whether the adaptive fixed PD configuration mode needs to be adjusted.

7. The method according to claim 6, wherein comparing the window size of the target object with the size of the target PD block comprises:

if the window size of the target object is smaller than the size of the target PD block, reconfiguring the fixed PD configuration mode based on the window size of the target object, so that a size of a reconfigured target PD block is not greater than the window size of the target object; and wherein performing the stable focusing by using the PD information obtained in the adaptive fixed PD configuration mode comprises:
performing the stable focusing by using PD information obtained in a reconfigured adaptive fixed PD configuration mode.

8. The method according to claim 1, further comprising:
obtaining a window position of the target object in the current frame; and comparing the window position of the target object in the current frame with a position of a target PD block to determine whether the adaptive fixed PD configuration mode needs to be adjusted, wherein the target PD block is a PD block with a minimum spacing between a center point of all PD blocks obtained through a configuration in the adaptive fixed PD configuration mode and a center point of a window of the target object.

9. The method according to claim 8, wherein comparing the window position of the target object in the current frame with the position of the target PD block comprises:

if a spacing between the center point of the window of the target object and a center point of the target PD block is greater than a threshold, adjusting the adaptive fixed PD configuration mode based on the window position of the target object for reconfiguring the target PD block so that a center point of the reconfigured target PD block overlaps with the center point of the window of the target object or a spacing is less than the threshold; and wherein performing the stable focusing by using the PD information obtained in the adaptive fixed PD configuration mode comprises:
performing the stable focusing by using PD information obtained in a reconfigured adaptive fixed PD configuration mode.

10. The method according to claim 1, wherein before detecting whether the current frame comprises the target object, the method further comprises:

setting a PD configuration mode as the adaptive fixed PD configuration mode by default.

11. The method according to claim 1, wherein the method further comprises:

when the current frame comprises two or more preset objects on which focusing needs to be performed, determining one of the preset objects as the target object according to a preset filtering rule.

12. A focusing method applied to a terminal device, wherein the method comprises:

detecting whether a current frame comprises a target object, wherein the target object is one of preset objects on which focusing needs to be performed;

in response to detecting that the current frame does not comprise the target object, converting phase detection (PD) information obtained in a fixed PD configuration mode into PD information in a variable PD configuration mode; and performing focusing on the current frame based on the converted PD information.

13. The method according to claim 12, wherein the method further comprises:

in response to detecting that the current frame comprises the target object, determining whether the target object is in a motion state; and in response to determining that the target object is in the motion state, performing tracking focusing by using PD information with a variable filtering length; and in response to determining that the target object is in a static state, performing stable focusing by using PD information obtained in an adaptive fixed PD configuration mode.

14. The method according to claim 13, wherein performing the tracking focusing by using the PD information with the variable filtering length comprises:

predicting a focus position of the target object to obtain a quasi-focus position by using a PD data buffer, wherein the quasi-focus position is used by the terminal device to drive a motor of the terminal device to move, and wherein a size of the PD data buffer is inversely proportional to a change rate of a window size of the target object.

15. The method according to claim 14, wherein predicting the focus position of the target object to obtain the quasi-focus position by using the PD data buffer comprises:

obtaining PD information of the current frame;
storing the PD information of the current frame into the PD data buffer;
obtaining target PD information based on PD information of each frame in the PD data buffer; and
obtaining the quasi-focus position based on the target PD information.

16. The method according to claim 12, further comprising:
obtaining a window size of the target object in the current frame;

obtaining a size of a target PD block obtained through a configuration in the adaptive fixed PD configuration mode, wherein the target PD block is a PD block with a minimum spacing between a center point of all PD blocks obtained through the configuration in the adaptive fixed PD configuration mode and a center point of a window of the target object; and comparing the window size of the target object with the size of the target PD block to determine whether the adaptive fixed PD configuration mode needs to be adjusted.

17. The method according to claim 12, wherein before detecting whether the current frame comprises the target object, the method further comprises:

setting a PD configuration mode as the adaptive fixed PD configuration mode by default.

18. The method according to claim 12, wherein the method further comprises:

when the current frame comprises two or more preset objects on which focusing needs to be performed, determining one of the preset objects as the target object according to a preset filtering rule.

19. A terminal device, wherein the terminal device comprises:

a non-transitory computer-readable storage medium storing instructions; and one or more processors in communication with the medium and upon execution of the instructions, configured to:

detect whether a current frame comprises a target object, wherein the target object is one of preset objects on which focusing needs to be performed;

in response to detecting that the current frame comprises the target object, determine whether the target object is in a motion state; and in response to determining that the target object is in the motion state, perform tracking focusing by using phase detection (PD) information with a variable filtering length; and in response to determining that the target object is in a static state, perform stable focusing by using PD information obtained in an adaptive fixed PD configuration mode.

20. A terminal device, wherein the terminal device comprises:

a non-transitory computer-readable storage medium storing instructions; and one or more processors in communication with the medium and upon execution of the instructions, configured to:

detecting whether a current frame comprises a target object, wherein the target object is one of preset objects on which focusing needs to be performed;

in response to detecting that the current frame does not comprise the target object, converting phase detection (PD) information obtained in a fixed PD configuration mode into PD information in a variable PD configuration mode; and performing focusing on the current frame based on the converted PD information.

* * * * *

UNITED STATES PATENT AND TRADEMARK OFFICE
CERTIFICATE OF CORRECTION

PATENT NO. : 11,363,187 B2
APPLICATION NO. : 17/227007
DATED : June 14, 2022
INVENTOR(S) : Cong Chen et al.

It is certified that error appears in the above-identified patent and that said Letters Patent is hereby corrected as shown below:

In the Specification

In Column 1 Line 9, Delete "PCT/CN2019.088971," and insert -- PCT/CN2019/088971, --.

Signed and Sealed this
Fourth Day of October, 2022

Katherine Kelly Vidal
*Director of the United States Patent and Trademark Office*